March 15, 1932. H. D. STEVENS 1,850,053
TIRE RIMMING MACHINE
Filed Nov. 10, 1930 3 Sheets-Sheet 1

INVENTOR
Horace D. Stevens
BY
ATTORNEYS

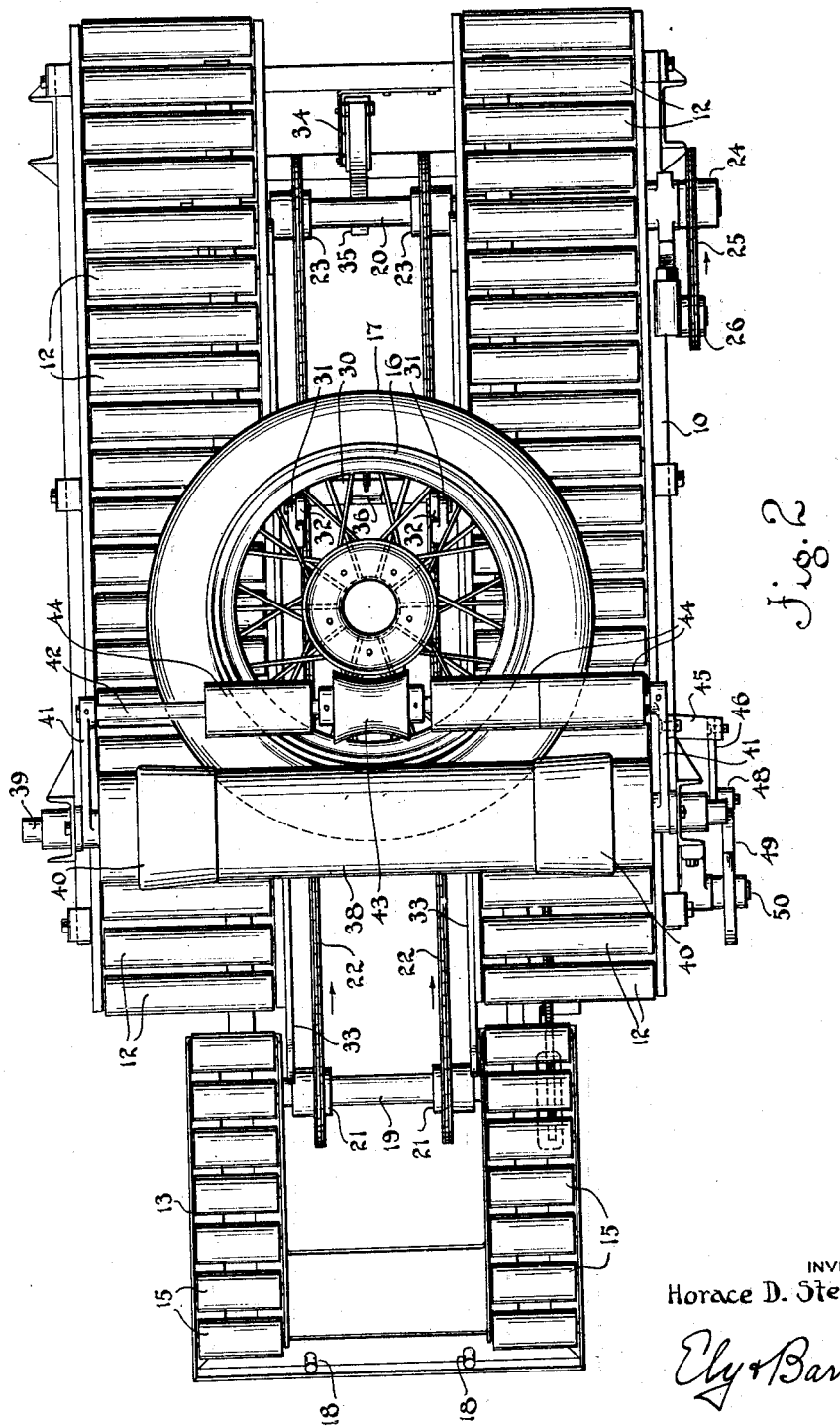

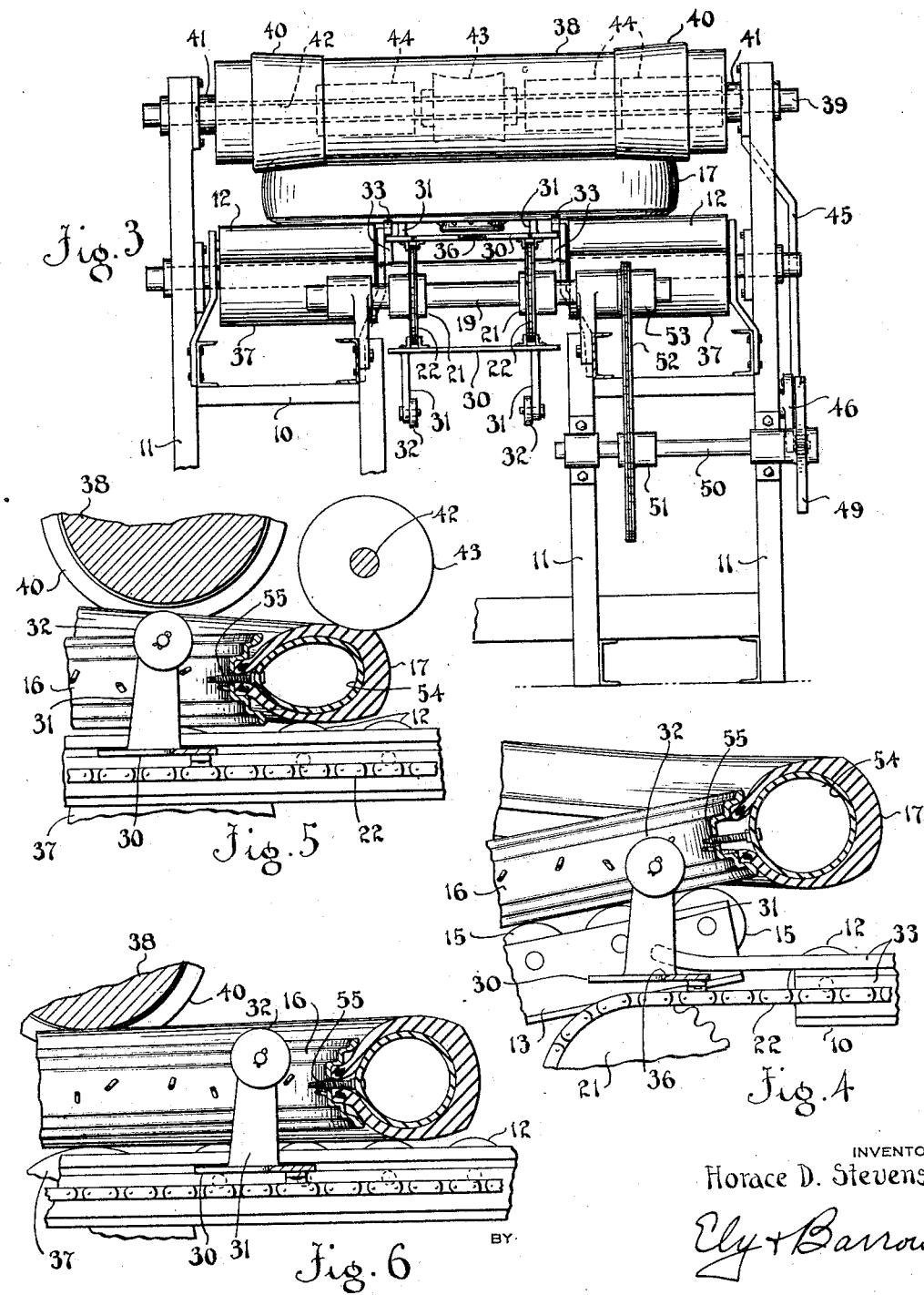

Patented Mar. 15, 1932

1,850,053

UNITED STATES PATENT OFFICE

HORACE D. STEVENS, OF AKRON, OHIO, ASSIGNOR TO THE FIRESTONE TIRE & RUBBER COMPANY, OF AKRON, OHIO, A CORPORATION OF OHIO

TIRE RIMMING MACHINE

Application filed November 10, 1930. Serial No. 494,578.

This invention relates to tire-rimming machines, and more especially it relates to apparatus for mounting pneumatic tire casings, with inner tubes therein, upon vehicle wheels equipped with the so-called "drop-center" rims.

The chief objects of the invention are to conserve labor, and to reduce the time and cost of mounting tires on rims. A more specific object is to provide simple, efficient, and economical apparatus for applying tire casings to drop-center rims after the tire and rim have been determinately positioned with relation to each other in the machine.

Of the accompanying drawings:

Figure 2 is a plan view thereof.

Figure 3 is a section on line 3—3 of Figure 1.

Figure 4 is a fragmentary section of the work and apparatus at the initial stage of operation.

Figure 5 is a view similar to Figure 4 at an advanced stage of operation.

Figure 6 is a view similar to Figure 4 at a farther advanced stage of operation.

Figure 1:
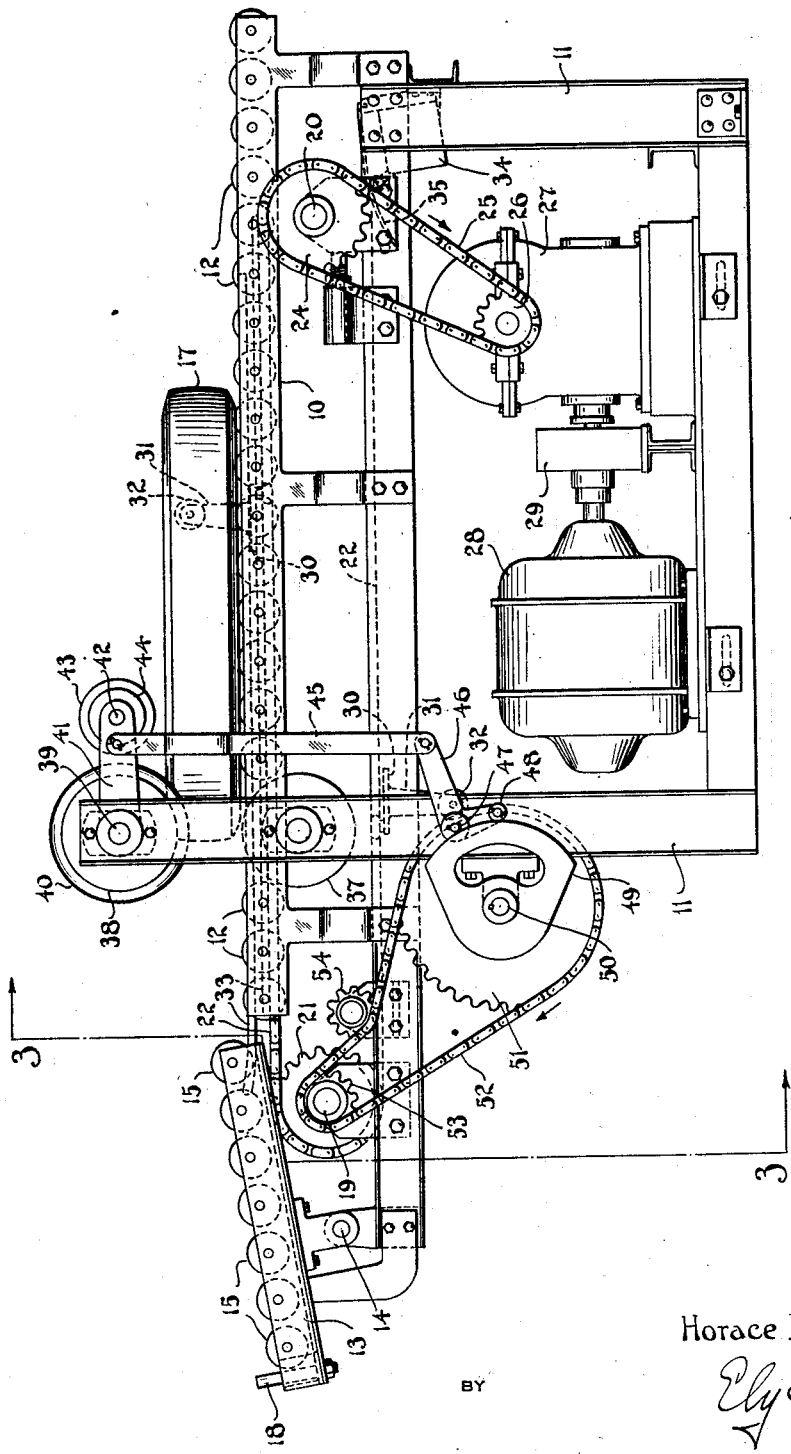
Figure 1 is a side elevation of a machine embodying the invention in its preferred form, and the work therein.

Referring to the drawings, 10 is an open frame supported upon legs or standards 11, 11, and 12, 12 are anti-friction rollers with axes disposed transversely of the frame, and arranged in two parallel rows along opposite sides of the top of the frame, the central portion of the frame being open. At the work-receiving end of the frame 10, (the left end as shown in the drawings) is a tiltable table 13 pivoted on the frame at 14, said table comprising anti-friction rollers 15, 15 arranged parallel to the rollers 12 in two rows at opposite sides of the table. The length of the table 13 is substantially the same as the diameter of a wheel 16 upon which a tire 17 is to be mounted. The normal inoperative position of the table is inclined with relation to the frame, as is clearly shown in Figure 1, so that the rollers 15 at the delivery end of the table are positioned somewhat above the adjacent rollers 12 of the frame. By tilting the table on its pivot 14 the series of rollers 15 are brought into horizontal alignment with the rollers 12. A pair of studs 18, 18 are mounted upon the rear of the table 13 and project above the rollers 15 to provide positioning means for a wheel 16 when the latter is placed upon the table.

Mounted in suitable bearings on the frame 10, and extending transversely of the frame at its receiving end is a shaft 19, and a similar shaft 20 is mounted in the delivery end of the frame. Mounted upon the shaft 19 are sprockets 21, 21 which are connected by a pair of parallel sprocket chains 22, 22 with sprockets of equal size 23, 23 mounted upon the shaft 20. The upper reach of each chain 22 extends along the top of the frame a little below the tops of the rollers 12, 15, at opposite sides of the central open portion of the machine between the two rows of rollers.

For driving the sprocket chains 22 in the direction indicated by the arrows in the drawings, the shaft 20 has mounted on one end thereof a sprocket 24 connected by a sprocket chain 25 with a sprocket 26 on the drive-shaft of a reduction-gear device 27, and the latter is driven by a motor 28, a power-operated brake 29 being associated with the driving connection between the motor and the reduction-gear device.

At two equally spaced apart points longitudinally of the sprocket chains 22, the latter are connected by transverse tie-plates 30, 30, each of which is formed adjacent its respective ends with upstanding arms 31, 31 having rollers 32, 32 journaled in their free ends. Parallel, spaced apart plates 33, 33 are mounted upon the frame 10 beside the upper reach of each chain 22 to provide guideways which receive the respective end portions of the tie-plates 30 and hold the latter against vertical displacement.

Mounted upon the frame 10 at the delivery end thereof is a normally closed electrical switch 34 in the electrical circuit which includes the motor 28, and said switch is provided with an operating lever 35 which extends into the orbit of the tie-plates 30 and is adapted to be engaged and operated by the trailing edges of the latter, as the chains 22 pass around the sprockets 23, to open the switch 34 and stop the motor. The trailing edge of each tie-plate 30 is beveled or chamfered at 36 where it engages the switch-lever 35. The arrangement is such that when either tie-plate stops the machine by throwing the lever 35, the other tie-plate is so positioned that the arms 31 thereof project upwardly between the rows of rollers 15 as is clearly shown in Figure 4. The arms 31 are adapted to engage the inner periphery of the rim of a wheel 16, and to propel the rim and a tire 17, over the rollers 15, 12, from the receiving to the delivery end of the machine.

Rollers 37, 37 are respectively interposed in the two series of rollers 12 adjacent the receiving end of the machine, said rollers being of considerably larger diameter than the rollers 12, and having their upper surfaces in alignment with the upper surfaces of rollers 12. A roller 38 of the same diameter as the rollers 37 is journaled upon a shaft 39 and extends across the machine, at a distance above the rollers 37 which is slightly less than the width of a tire 17. Thus a tire passing between the rollers 37, 38 will be slightly flattened or compressed as is shown in Figure 6. The diameter of the roller 38 is locally increased by tapered collars 40, 40 mounted thereon at positions where they are adapted concurrently to engage the diametrically opposite sides of a tire passing thereunder.

Journaled upon the shaft 39 at opposite ends thereof are respective arms 41, 41, the free ends of which extend toward the delivery end of the machine and carry a fixed shaft 42 extending transversely of the machine. The shaft 42 has a presser roller 43 of stiff soft rubber composition journaled thereon at its middle, and also carries a plurality of cylindrical weights 44, 44. The presser roller 43 has a waisted or concave surface so that it may make contact with the leading edge of a tire over a substantial area, when it is in its lowered, operative position.

For raising and lowering the presser roller 43 into and out of operative position, one of the arms 41 is connected by a link 45 to one arm of an L-shaped cam-lever 46 which is pivoted at 47 on the frame 10 and has its other arm provided with a cam-roller 48 which rides upon the periphery of a cam 49. The latter is mounted upon a shaft 50 which is journaled in suitable bearings mounted upon the frame 10 and provided with a sprocket 51 connected by a sprocket chain 52 with a sprocket 53 mounted upon the driven shaft 19. An adjustable chain-tightening sprocket 54 is provided for the chain 52.

The machine operates as follows: With the parts in their inoperative positions, that is, with the motor stopped, the presser roller 43 in lowered position, and a pair of arms 31 extending upwardly through the delivery end of the table 13, a wheel 16 is so positioned upon the latter that the arms 31 extend through the spokes thereof and the rollers 32 engage the rim of the wheel, care being taken to have the valve stem hole of the rim nearest the delivery end of the machine. Then a tire 17 having an inner tube 54 therein is started upon the rim as is shown in Figure 4, and the valve stem 55 of the inner tube is passed through the hole provided therefor in the rim. The position of the rollers 12 below the adjacent rollers 15 of the table 13 facilitates the manual positioning of the tire and rim as described.

The table 13 is then manually tilted to a horizontal position, and the motor 28 is set in motion to propel the endless chains 22 and thereby to move the tire and rim toward the rollers 37, 38, which they pass between with but little distortion of the tire. Almost immediately thereafter the tire engages the presser roller 43, which, in its lowered position, is so close to the rollers 12 that the leading side of the tire in passing thereunder is considerably flattened and elongated in a radial direction, with the result that its bead portions are moved substantially into contact with each other and thus permit such relative radial movement of the tire and wheel that said bead portions slide into the "well" constituting the annular medial portion of the drop-center rim of the wheel 16, as is most clearly shown in Figure 5.

At about the time the rim of the wheel 16 engages the presser roller 43, the cam 49 acting through the cam lever 46 and link 45, raises the presser roller to the inoperative position shown in Figure 2, and as the work continues its progress toward the delivery end of the machine the tire is forced progressively onto the rim solely by engagement with the rollers 37, 38, as is shown in Figure 6, the non-concentric relation of the wheel and tire, shown best in Figure 2, permitting the bead portions of the tire to pass freely over the outer periphery of the wheel rim.

When the wheel with the tire thereon passes out of engagement with the rollers 37, 38, the natural resilience of the tire causes it to assume a more nearly concentric position on the rim so that the tire and rim cannot be inadvertently separated.

As the work reaches the delivery end of the machine the arms 31 are withdrawn from engagement with the wheel, and the tie plate 30 in passing around the sprockets 23 operates the arm 35 of the switch 34 thus stopping the machine. The assembled work is then removed from the machine and the operations described may be repeated, the cam 49 having again lowered the presser roller 43 after the work passed the same.

The invention may be variously modified within the scope of the appended claims, which are not limited wholly to the specific construction shown and described.

What is claimed is:

1. In a tire-rimming machine, the combination of means for laterally compressing a tire casing locally to move its bead portions together at the area of compression, and means for moving a drop-center tire rim relatively to the tire while it is so compressed to seat the juxtaposed bead portions of the tire in the well of the tire rim.

2. In a tire-rimming machine, the combination of means for bodily feeding a tire casing and a drop center rim along a determinate course, and means for progressively passing the bead portions of the tire over opposite sides of the rim to seat the tire thereon as the tire and rim are so fed.

3. In a tire-rimming machine, the combination of means for bodily moving a tire casing and a drop center tire rim together along a determinate course, means for effecting such relative movement of the tire and rim as to cause them to assume non-concentric relation, and means for mounting the tire on the rim while they continue to move in non-concentric relation.

4. In a tire-rimming machine, the combination of means for bodily moving a tire casing and a drop center rim together along a determinate course, means for locally compressing the tire to move its bead portions together thereat and so retarding the bodily movement of the tire as to cause said bead portions locally to enter the well of the rim, and means for progressively passing the rest of the tire bead structures onto the rim.

5. In a tire-rimming machine, the combination of a work-support comprising anti-friction rollers, means for propelling a tire casing and drop center rim bodily thereover, and a plurality of presser rollers cooperating with said anti-friction rollers and adapted to apply the tire to the rim progressively from its leading side to its trailing side as the tire and rim move along the work-support.

6. In a tire-rimming machine, the combination of a work-support comprising anti-friction rollers, means for bodily propelling a tire casing and drop center rim therealong, and a plurality of presser rollers cooperating with said anti-friction rollers and adapted first to compress the tire locally to cause its beads locally to enter the well in the middle of the rim, and then progressively to apply the rest of the bead portions of the tire to the rim.

7. In a tire-rimming machine, the combination of means for bodily feeding a tire casing and drop-center rim in a determinate course, presser rollers along said course adapted first to compress the tire locally to force its beads together so that they enter the well of the rim, and then to force the rest of the bead portions of the tire progressively onto the rim, and means for moving one of said presser rollers out of operative position in timed relation to the movement of the tire and rim.

8. In a tire-rimming machine, the combination of a work-support comprising anti-friction rollers, means for feeding a tire casing and drop-center rim longitudinally thereof, a presser roller mounted in fixed position above the anti-friction rollers and adapted to engage the work with light pressure as it passes thereunder, and a presser roller on the delivery side of the first mentioned presser roller adapted to engage the tire with relatively heavy pressure as it passes thereunder.

9. A combination as defined in claim 8 including means for raising and lowering the last mentioned presser roller in timed relation to the movement of the tire and rim.

HORACE D. STEVENS.